US006468696B1

United States Patent
Siling et al.

(10) Patent No.: US 6,468,696 B1
(45) Date of Patent: Oct. 22, 2002

(54) POLYMER GEL ELECTROLYTE SYSTEMS

(75) Inventors: Sventlana A. Siling, Moscow (RU); Sergei E. Smirnov, Moscow (RU); Alex Rapoport, San Carlos, CA (US)

(73) Assignee: Advanced Polymer Research, Inc., Sunnyvale, CA (US)

(*) Notice: Subject to any disclaimer, the term of this patent is extended or adjusted under 35 U.S.C. 154(b) by 109 days.

(21) Appl. No.: 09/704,746

(22) Filed: Nov. 3, 2000

(51) Int. Cl.$^7$ .............................................. H01M 10/40
(52) U.S. Cl. ........................................ 429/303; 429/317
(58) Field of Search ................................ 429/303, 317; 252/62.2

(56) References Cited

U.S. PATENT DOCUMENTS

| | | | | |
|---|---|---|---|---|
| 3,708,729 A | * | 1/1973 | Berger .................... | 252/62.2 X |
| 4,281,072 A | * | 7/1981 | Wetton et al. .......... | 252/62.2 X |
| 6,130,414 A | * | 8/2000 | Cabasso et al. ......... | 429/316 X |
| 6,248,480 B1 | * | 6/2001 | Narang et al. .......... | 429/317 X |

FOREIGN PATENT DOCUMENTS

| | | | | |
|---|---|---|---|---|
| JP | 2000-012083 | * | 1/2000 | .......... H01M/10/40 |
| RU | 2069423 | | 11/1996 | |

OTHER PUBLICATIONS

Hay, Allan S., Commentary, "Reflections on Oxidative Coupling, 11, Oxidation of 2,6–Diubstituted Phenols", J. Polym-.Sci., 58, 581 (1962) (Month Unknown).

Hay, Allan S., and Ding, Yong, "Poly(p–phenylene oxide)", Polyer Data Handbook, Oxford University Press, New York, 1099, (Publication Rate Omitted).

Wieczorek, W., et al., "Application of Acrylic Polymers in Blend–Based Polymeric Electrolytes", Institute of Inorganic Technology, Warsaw University of Technology, ul. Noakowskiego 3, 00–664, Warsaw, Poland (Publication Date Unknown).

Besner, A. Vallee S. and Prud'Homme, J., "Comparative Study of Poly(Ethylene Oxide) Electrolytes Made With $LiN(CF_3SO_2)_2$, $LiCF_3SO_3$ and $LiClO_4$; Thermal Properties and Conductivity Behavior", Department of Chemistry, University of Montreal, Montreal, Quebec, Canada H3C 3V1. (Publication Date Unknown).

* cited by examiner

Primary Examiner—Stephen Kalafut
(74) Attorney, Agent, or Firm—McDermott, Will & Emery

(57) ABSTRACT

Disclosed is a polymer gel electrolyte system for use in an electrochemical cell, the system that includes a support structure comprising an aromatic polyether polymer film; and an electrolyte comprising an alkali metal salt in an organic solvent impregnated within said support structure. Advantageously, the system has an electrical conductivity from about $10^{-2}$ to about $10^{-3}$ $\Omega cm^{-1}$ at about $-30°$ C. to room temperature.

33 Claims, 1 Drawing Sheet

POLYMER GEL ELECTROLYTE SYSTEMS

TECHNICAL FIELD

This invention relates generally to electrolytes for electrochemical cells and storage batteries, and more particularly to polymer gel electrolytes for such cells.

BACKGROUND OF THE INVENTION

There has been a great deal of interest in developing better and more efficient methods for storing energy for applications such as radio communications, satellites, portable computers, and electric vehicles, to name but a few. Accordingly, recently there have been concerted efforts with the aim of developing high energy, low weight cost-effective batteries having improved performance characteristics.

Rechargeable, or secondary cells are more desirable than primary (non-rechargeable) cells for use in certain applications since the associated chemical reactions which take place at the positive and negative electrodes of the battery are reversible. Electrodes for secondary cells are capable of being regenerated (i.e. recharged) many times by the application of an electrical charging current thereto. Numerous advanced electrode systems have been developed for storing electrical charge in chemical form. Concurrently, much effort has been dedicated to the development of electrolytes capable of enhancing the capabilities of electrochemical cells.

Heretofore, electrolytes have been either liquid electrolytes as are found in conventional wet cell batteries, such as lead-acid or nickel-cadmium cells, or solid films as are available in newer, more advanced battery systems. Each of these systems has inherent limitations and related deficiencies which make them unsuitable for particular applications.

Liquid electrolytes, while demonstrating acceptable ionic conductivity, tend to leak out of the cells into which they are sealed. While better manufacturing techniques have lessened the occurrence of leakage, cells still do leak potentially dangerous liquid electrolytes from time-to-time. This is particularly true of the currently available lithium-based cells. Moreover, leakage from the cell lessens the amount of available electrolyte in the cell, thus reducing the usefulness of the cell. Cells using liquid electrolytes are also not available for all sizes and shapes of batteries.

By contrast, solid electrolytes are substantially free from problems of leakage. However, they have generally have much lower conductivities as compared to liquid electrolytes. For example, conventional solid electrolytes have ionic conductivities in the about $10^{-5}$ S/cm (Siemens per centimeter), whereas for many applications an ionic conductivity $>10^{-3}$ S/cm is required. Good ionic conductivity is necessary to ensure a battery system capable of delivering requisite amounts of power for a given application. For example, good conductivity is necessary for the high rate operation demanded by cellular telephones and satellites. Accordingly, solid electrolytes are inadequate for use in many high-performance battery systems.

While solid electrolytes are intended to replace the combination of liquid electrolytes and separators used in conventional batteries, the above-described limitations have prevented them from being fully implemented. One class of solid electrolytes, specifically gel electrolytes, have shown some promise. Gel electrolytes contain a significant fraction of solvents (or plasticizers) in addition to a salt and a polymer. In recent years, there has been an increasing trend to replace conventional Ni—Cd batteries with lithium batteries, particularly those utilizing gel-polymer electrolytes. Advantages of such batteries include, for example, a high voltage (3–4V), a high power density; a low self-discharge (less than 1% per year), a long operation time (because gel-polymer electrolytes do not leak or decompose upon use), a high performance efficiency (85–95%), and a wide range of operating temperatures (from about −50° C. to about 50° C.).

These advantages make lithium batteries promising power sources for battery-powered automobiles. While Ni—Cd batteries provide only a 60–150 km operating range and account for about 30% of the car's weight, lithium batteries can provide a 450 km range and are much lighter. Unfortunately, standard liquid electrolytes used in conventional lithium batteries are aggressive with respect to the cathode and anode. Upon cycling, an oxide film forms on the lithium anode, which eventually renders the battery inoperative. Another problem is the growth of dendrites on the lithium anode, which may short-circuit it to the cathode.

Despite the advantages of gel-polymer electrolytes, the lithium electrode still undergoes passivation which decreases the life expectancy of the battery. This problem has presented a significant limitation to the successful implementation of gel polymer electrolytes in electrochemical cells and storage batteries.

Accordingly, there exists a need for a new polymer gel electrolyte system which combines the properties of good mechanical integrity, as well as the ability to absorb sufficient amounts of liquid electrolytes so as to have a high ionic conductivity comparable to that of liquid electrolytes. The desired electrolytes should also avoid or limit electrode passivation, as well as each of the above described problems associated therewith, such as decreased life expectancy of the battery.

SUMMARY OF THE INVENTION

Figure 1:
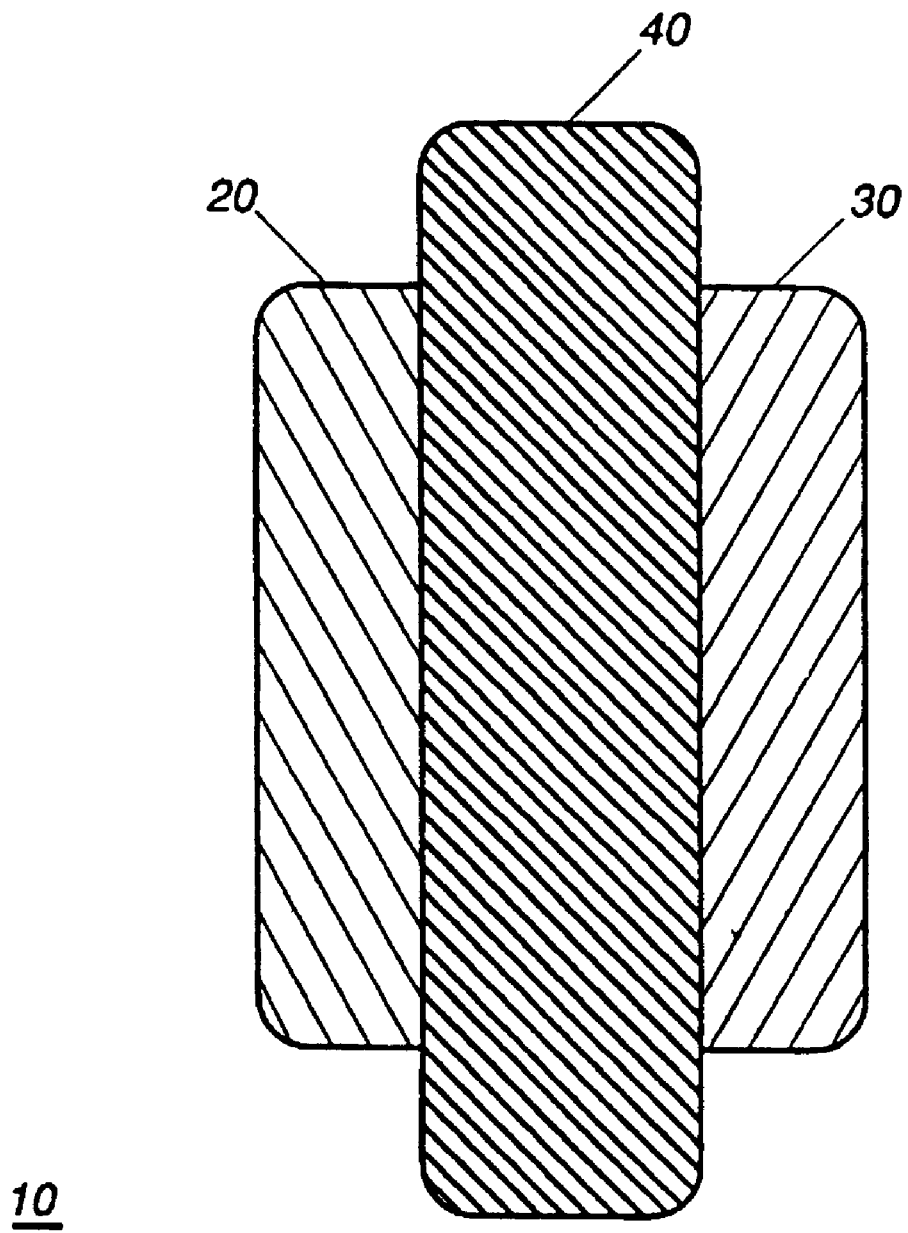
FIG. 1 is a schematic representation of an electrochemical cell in accordance with the present invention.

An advantage of the present invention is a polymer gel electrolyte system having an electrical conductivity from about $10^{-2}$ to about $10^{-3}$ $\Omega cm^{-1}$ at about −30° C. to room temperature.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a polymer gel electrolyte system for use in an electrochemical cell, the system comprising:

a support structure comprising an aromatic polyether polymer film; and an electrolyte comprising an alkali metal salt in an organic solvent impregnated within said support structure.

Another advantage of the present invention is a composition for use as a polymer gel electrolyte having an electrical conductivity of about $10^{-2}$ to about $10^{-3}$ $\Omega cm^{-1}$ at room temperature, comprising:

a polymer support material comprising at least one of polyphenylene oxide or a mixture thereof with at least one of a polysulfone, polyarylate, polycarbonate, polyethylene oxide, and polypropylene oxide; and a plasticizer solution impregnated with said polymeric support material, said plasticizer solution comprising at least one lithium salt in at least one organic solvent.

Additional advantages of the present invention will become readily apparent to those skilled in the art from the following detailed description, wherein only the preferred embodiment of the invention is shown and described, simply by way of illustration of the best mode contemplated for carrying out the invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DETAILED DESCRIPTION OF THE INVENTION

Referring now to FIG. 1, illustrated therein is a schematic representation of an electrochemical cell or rechargeable storage battery cell (secondary cell) in accordance with the instant invention. The cell 10 includes a spaced-apart positive electrode (cathode) 20 and a negative electrode (anode) 30. For lithium-based cells, the positive electrode (cathode) 20 may be fabricated of any of a number of chemical systems known to those of ordinary skill in the art. Examples of such systems include manganese oxide, nickel oxide, cobalt oxide, vanadium oxide, $LiMnO_2$, $LiMn_2O_4$, and combinations thereof. The negative electrode (anode) 30 may likewise be fabricated from any of a number of electrode materials known to those of ordinary skill in the art. Selection of the negative electrode material is dependent on the selection of the positive electrode so as to assure an electrochemical cell which will function properly for a given application. In this context, the negative electrode (anode) may be fabricated from alkali metals (e.g., Li), alkali metal alloys, carbon, graphite, petroleum coke, and combinations thereof. The types of negative and positive electrode materials recited above are typically associated with lithium battery cells. It is to be noted however that the polymer gel electrolyte of the present invention is not limited to use in lithium-based cells; rather, the polymer gel electrolyte system of the instant invention may be advantageously employed with nickel-cadmium, nickel-metal hydride, lead-acid, or any other battery system.

Operatively disposed between the positive 20 and negative 30 electrodes is a polymer gel electrolyte system 40 having a conductivity of from about $10^{-2}$ to about $10^{-3}$ ohms cm$^{-1}$. The electrolyte system 40 comprises a polymer gel support structure including at least one aromatic polyether or a mixture of the at least one aromatic polyether with at least one of polysulfone, polyarylate, polycarbonate, polyethylene oxide and polypropylene oxide, the support structure being impregnated or absorbed with a plasticizer solution including a lithium salt and a mixture of organic solvents. Aromatic polyethers usable according to the present invention include, but are not limited to, polyphenylene oxides (such as poly (2,6-dimethyl-1,4-phenylene oxide, poly(2,6-diphenyl-1,4-phenylene oxide), and poly(2,6-dibutyl-1,4-phenylene oxide)).

The plasticizer impregnated within the support structure is selected to optimize performance of the cathode and anode couple. Thus, for lithium type cells the liquid electrolyte impregnated within the support structure is typically a solution of a lithium salt, or combination of lithium salts, dissolved in a solvent mixture. Typical lithium salts include, but are not limited to, lithium perchlorate and lithium perfluoroborate. Solvents include, but are not limited to, propylene carbonate, ethylene carbonate, diethyl carbonate, dimethyl carbonate, dipropyl carbonate, gamma-butyrlolactone, tetrahydrofuran, toluene, chloroform and combinations thereof. However, the organic solvent is free from diethyl ether and/or diethylene glycol.

The invention may be further understood by reference to the examples given below.

EXAMPLE 1

Compositions are prepared by impregnating polymer films, under argon pressure, with a plasticizer, e.g., 1.0M solution of $LiClO_4$ in a toluene-propylenecarbonate mixture and then allowing the impregnated gel to remain for 18 hours. The electrochemical characteristics of the gel polymer electrolytes were studied using a three-electrode cell in a Li-gel polymer electrolyte-Li system. One lithium electrode is placed on the bottom of the cell and covered with the gel polymer electrolyte film. Then, a second lithium electrode is applied on the top. The working surface of the electrodes was 4 cm$^{-2}$. A uniform distribution of the gel-polymer electrode between the electrodes was achieved with use of a spring bias system. A Li/Li$^+$ couple was used as a reference electrode. Table 1 illustrates the conductivity of various polyphenyleneoxide-based electrolytes. Table 2 illustrates the conductivity of various polymer mixture-based electrolytes. Table 3 illustrates the conductivity of various polyphenyleneoxide-based electrolytes at room temperature and at temperature of –30° C.

TABLE 1

| Polymer | Amount of polymer, g | Amount of solvent, ml | Volume ratio of toluene to γ-butyro-lactone (or propylene carbonate | LiBF$_4$, g | LiClO$_4$, g | Conductivity, σ Ω cm$^{-1}$ |
|---|---|---|---|---|---|---|
| PPO | 100 | 205 | 1.0:1.0 | 21.7 | — | 2.8 10$^{-3}$ |
| PPO | 100 | 181 | 3.0:1.0 | 18.5 | — | 3.3 10$^{-3}$ |
| PPO | 100 | 370 | 1.0:1.5 | 35.0 | — | 2.0 10$^{-3}$ |
| PPO | 100 | 120 | 5.0:1.0 | — | 14.5 | 3.4 10$^{-3}$ |
| PPO | 100 | 274 | 1.0:2.7 | — | 26.5 | 2.1 10$^{-3}$ |
| PPO | 100 | 200 | 4.0:1.0 | — | 26.0 | 2.1 · 10$^{-2}$ |
| PPO | 100 | 200 | 3.0:2.0 | — | 40.0 | 1.25 · 10$^{-2}$ |
| PPO | 100 | 200 | 7.0:3.0 | — | 33.0 | 2.0 · 10$^{-2}$ |
| PPO | 100 | 200 | 6.0:4.0 | — | 41.0 | 7.0 · 10$^{-2}$ |

TABLE 1-continued

| Polymer | Amount of polymer, g | Amount of solvent, ml | Volume ratio of toluene to γ-butyro-lactone (or propylene carbonate) | LiBF$_4$, g | LiClO$_4$, g | Conductivity, σ Ω cm$^{-1}$ |
|---|---|---|---|---|---|---|
| PPO | 100 | 200 | 8.0:2.0 | — | 28.0 | $2.5 \cdot 10^{-2}$ |
| PPO | 100 | 200 | 3.0:2.0 | — | 40.0 | $2.0 \cdot 10^{-2}$ |
| Poly (2,6-diphenyl-1,4-phenylene oxide) | 100 | 370 | 2.0:1.0 | 18.5 | — | $2.05 \cdot 10^{-3}$ |
| Poly (2,6-dibutyl-1,4-phenylene oxide) | 100 | 120 | 2.0:1.0 | — | 14.5 | $2.81 \cdot 10^{-3}$ |

TABLE 2

| No. | Polymers | Composition and amount of mixture, % g | Composition and amount of plasticizer, ml | Volume ratio of plasticizer's components | Salt | Amount of salt, mass parts | Conductivity, σ, Ωcm$^{-1}$ |
|---|---|---|---|---|---|---|---|
| 1 | PPO, PEO | 95:5 100 | toluene, γ-BL, 200 | 1.0:1.0 | LiBF$_4$ | 21.6 | $1.86 \cdot 10^{-3}$ |
| 2 | PPO, PEO | 85:15 100 | toluene, γ-BL, 200 | 1.0:1.0 | LiBF$_4$ | 21.6 | $1.23 \cdot 10^{-3}$ |
| 3 | PPO, PEO | 94:6 180 | toluene, γ-BL, 180 | 3.0:1.0 | LiBF$_4$ | 18.5 | $1.82 \cdot 10^{-3}$ |
| 4 | PPO, PEO | 82:18 180 | toluene, γ-BL, 180 | 3.0:1.0 | LiBF$_4$ | 18.5 | $1.82 \cdot 10^{-3}$ |
| 5 | PPO, Polysulfone | 92:8 100 | THF, toluene, PC, 180 | 1.0:1.0:2.0 | LiClO$_4$ | 18.6 | $1.90 \cdot 10^{-3}$ |
| 6 | PPO, Polysulfone | 87:13, 100 | THF, toluene, PC, 180 | 1.0:1.0:2.0 | LiClO$_4$ | 18.5 | $1.29 \cdot 10^{-3}$ |
| 7 | PPO, Polyarylate | 93:7 100 | Chloroform PC, 160 | 3.0:2.0 | LiClO$_4$ | 18.5 | $1.73 \cdot 10^{-3}$ |
| 8 | PPO, Polyarylate | 86:14 100 | Chloroform PC, 160 | 3.0:2.0 | LiClO$_4$ | 18.5 | $1.18 \cdot 10^{-3}$ |
| 9 | PPO, Polycarbonate | 95:5 100 | Chloroform PC, 274 | 3.0:1.0 | LiClO$_4$ | 26.5 | $1.68 \cdot 10^{-3}$ |
| 10 | PPO, Polycarbonate | 86:14 100 | Chloroform PC, 274 | 3.0:1.0 | LiClO$_4$ | 26.5 | $1.21 \cdot 10^{-3}$ |

TABLE 3

| Polymers | Amount of polymer, g | Amount of solvent, ml | Volume ratio of toluene to propylene-carbonate | LiClO$_4$, g | Conductivity, σ, Ω cm$^{-1}$, room temperature | Conductivity, σ, Ω cm$^{-1}$, −30° C. |
|---|---|---|---|---|---|---|
| PPO | 100 | 200 | 4:1 | 26 | $2,1 \cdot 10^{-2}$ | $7,0 \cdot 10^{-3}$ |
| PPO | 100 | 200 | 3:2 | 40 | $1,25 \cdot 10^{-2}$ | $4,1 \cdot 10^{-3}$ |
| PPO | 100 | 200 | 7:3 | 33 | $2,0 \cdot 10^{-2}$ | $6,6 \cdot 10^{-3}$ |

The choice of suitable GPE compositions for use in a particular application is made based on the following considerations:

(1) a decrease in the concentration of solvent leads to gels which are too solid, which excessive solidification reduces conductivity, while an increase in the solvent concentration results in a gel which is too fluid and with poor mechanic characteristics;
(2) a decrease in the content of the lithium salt reduces the conductivity, while excessive increase leads to crystallization of salt, which also reduces the conductivity, In preparation of the GPEs, use is preferably made of PPO with a high film-forming ability (the reduced viscosity of a 0.5% cloroform solution of the PPO ranges from 0.1 to 0.95 dl/g). Before mixing, the components of the solvent are carefully dried over phosphorus pentoxide.

The compositions are prepared by adding a required amount of a 1.0 M solution of lithium salt to PPO powder and then allowing the resulting mixture to remain stay for 18–24 hours in an inert atmosphere at room temperature until gel forms. The battery is prepared by placing the GPE between a Li anode and a cathode made of LiMnO$_2$, LiMn$_2$O$_2$ and so on cathodes.

Polymer electrolyte on the base of PPO was tested in the Li—MnO$_2$ primary elements (dimension CR-2325) and in Li—LiV$_3$O$_8$ accumulators (dimension VR-2325). Every part consisted of 10 elements. Primary elements had service life of 140–150 hours at 20° C. and 115–125 hours at −15° C. (the resistance at discharge equal to 2 KOhm). When the resistance at discharge was 7,5 KOhm, elements had service life of 488–500 hours at −15° C., and service life of 540–560 hours at 20° C. Accumulators were discharged at resistance of 2 Kohm at 20° C. for 26–28 hours (charge period of 40 hours), and at 30° C. at resistance 4 Kohm for 24–26 hours. GPE may be used in any Li-elements and among them in Li-ion accumulators.

REFERENCES

1. Allan S., Hay and Yong Ding, "Poly(2,6-dimethyL-1,4-phenylene oxide)" p.711–713, Polymer Data Handbook edited by Jamse E. Mark. Oxford University Press, New York, Oxford 1999 p. 1018.
2. A. Vallee, S. Besner and J. Prud'homme, "Comparative study of poly(ethylene oxyde) electrolytes made with LiN$_9$CF$_3$SO$_3$ and LiClO$_4$: thermal properties and conductivity behavior", Electrochimica Acta, Vol. 37, No. 9. pp. 1579–1583, 1992.
3. W. Wieczorek, K. Such, Z. Florjanczyk and J. Przyluski, "Application of acrylic polymers in blend-based polymeric electrolytes", Electrochimica Acta, Vol. 37, No. 9 pp. 1565–1567, 1992.
4. Siling S. A., Askadski A. A., Mescherjakova V. S., Kazanyseva V. V., Bazanov M. I. and Kovriga O. V. "Polymer composition for solid electrolytes", Pat. No. PU N2069423 H 01 M 6/18 (20.11.96), Publ. Bull. Izobr. N 32.

The purpose of the above description and examples is to illustrate some embodiments of the present invention with out implying any limitation. It will be apparent to those of skill in the art that various modifications and variations may be made to the apparatus and method of the present invention without departing from the spirit or scope of the invention. All patents and publications cited herein are incorporated by reference in their entireties.

What is claimed is:

1. A composition for use as a polymer gel electrolyte having an electrical conductivity of about $10^{-2}$ to about $10^{-3}$ $\Omega$cm$^{-1}$, comprising:
   a polymer support material comprising at least one of polyphenylene oxide or a mixture thereof with at least one of a polysulfone, polyarylate, polycarbonate, polyethylene oxide, and polypropylene oxide; and
   a plasticizer solution impregnated with said polymeric support material, said plasticizer solution comprising at least one lithium salt in at least one organic solvent.

2. A composition as in claim 1, wherein said composition comprises 100 parts by weight of said polymeric support material impregnated with 18.5–26.5 parts by weight of said at least one lithium salt.

3. A composition as in claim 2, wherein said plasticizer solution comprises about 18.5–26.5 gms of said at least one lithium salt in about 160–274 ml of said at least one organic solvent.

4. A composition as in claim 1, wherein said polymeric support material comprises 87–92 parts by weight of polyphenylene oxide and 8–13 parts by weight of polysulfone.

5. A composition as in claim 1, wherein said polymeric support material comprises 85–95 parts by weight of polyphenylene oxide and 5–15 parts by weight of polyethylene oxide.

6. A composition as in claim 1, wherein said polymeric support material comprises 86–95 parts by weight of polyphenylene oxide and 5–14 parts by weight of polyarylate.

7. A composition as in claim 1, wherein said polymeric support material comprises 86–95 parts by weight of polyphenylene oxide and 5–14 parts by weight of polycarbonate.

8. A composition as in claim 1, wherein said composition comprises 100 parts by weight of said polymeric support material impregnated with 18.5–26.5 parts by weight of lithium perchlorate.

9. A composition as in claim 1, wherein said composition comprises 100 parts by weight of said polymeric support material impregnated with 18.5–21.6 parts by weight of lithium perfluoroborate.

10. A composition as in claim 1, wherein said organic solvent comprises a mixture of toluene and gamma-butyrolactone in equal volume parts.

11. A composition as in claim 1, wherein said organic solvent comprises a mixture of 1 volume part of toluene, 1 volume part of tetrahydrofuran, and 2 volume parts of propylenecarbonate.

12. A composition as in claim 1, wherein said organic solvent comprises a mixture of 3 volume part of chloroform, 1–2 volume part of propylenecarbonate.

13. A composition of claim 1, wherein the composition has an electrical conductivity from about $10^{-2}$ to about $10^{-3}$ $\Omega$cm$^{-1}$ at a temperature from about −30° C. to room temperature.

14. A composition of claim 1, wherein the polyphenylene oxide comprises at least one member selected from the group consisting of poly(2,6-dimethyl-1,4-phenylene oxide), poly(2,6-diphenyl-1,4-phenylene oxide), and poly(2,6-dibutyl-1,4-phenylene oxide).

15. A composition of claim 1, wherein the lithium salt is selected from the group consisting of LiBF$_4$ and LiClO$_4$.

16. A composition of claim 1, wherein the organic solvent comprises at least one member selected form the group consisting of propylenecarbonate, ethylenecarbonate, diethyl carbonate, dimethylcarbonate, dipropylcarbonate, tetrahydrofuran, gamma-butyrolactone, toluene, chloroform and mixtures thereof.

17. A composition of claim 1, wherein the organic solvent is free from diethylether and diethylene glycol, or is free from diethylether or diethylene glycol.

18. A composition for use as a polymer gel electrolyte having an electrical conductivity of about $10^{-2}$ to about $10^{-3}$ $\Omega$cm$^{-1}$, comprising:
   a polymer support material comprising at least one of polyphenylene oxide or a mixture thereof with at least one of a polysulfone, polyarylate, polycarbonate, polyethylene oxide, and polypropylene oxide; and
   a plasticizer solution impregnated with said polymeric support material, said plasticizer solution comprising at least one alkali metal salt in at least one organic solvent.

19. A composition as in claim 18, wherein said composition comprises 100 parts by weight of said polymeric support material impregnated with 18.5–26.5 parts by weight of the alkali metal salt.

20. A composition as in claim 19, wherein said plasticizer solution comprises about 18.5–26.5 gms of said at least one alkali metal salt in about 160–274 ml of said at least one organic solvent.

21. A composition as in claim 18, wherein said polymeric support material comprises 87–92 parts by weight of polyphenylene oxide and 8–13 parts by weight of polysulfone.

22. A composition as in claim 18, wherein said polymeric support a material comprises 85–95 parts by weight of polyphenylene oxide and 5–15 parts by weight of polyethylene oxide.

23. A composition as in claim 18, wherein said polymeric support mod ok material comprises 86–95 parts by weight of polyphenylene oxide and 5–14 parts by weight of polyarylate.

24. A composition as in claim 18, wherein said polymeric support material comprises 86–95 parts by weight of polyphenylene oxide and 5–14 parts by weight of polycarbonate.

25. A composition as in claim 18, wherein said organic solvent comprises a mixture of toluene and gamma-butyrolactone in equal volume parts.

26. A composition as in claim 18, wherein said organic solvent comprises a mixture of 1 volume part of toluene, 1 volume part of tetrahydrofuran, and 2 volume parts of propylenecarbonate.

27. A composition as in claim 18, wherein said organic solvent comprises a mixture of 3 volume part of chloroform, 1–2 volume part of propylenecarbonate.

28. A composition of claim 18, wherein the composition has an electrical conductivity from about $10^{-2}$ to about $10^{-3}$ $\Omega\text{cm}^{-1}$ at temperature from about $-30°$ C. to room temperature.

29. The composition of claim 18, wherein the polyphenylene oxide comprises at least one member selected from the group consisting of poly(2,6-dimethyl-1,4-phenylene oxide), poly(2,6-diphenyl-1,4-phenylene oxide), and poly(2,6-dibutyl-1,4-phenylene oxide).

30. The composition of claim 18, wherein the alkali metal salt is a lithium salt.

31. The composition of claim 30, wherein the lithium salt is selected from the group consisting of $LiBF_4$ and $LiClO_4$.

32. The composition of claim 18, wherein the organic solvent comprises at least one member selected form the group consisting of propylenecarbonate, ethylenecarbonate, diethyl carbonate, dimethylcarbonate, dipropylcarbonate, tetrahydrofuran, gamma-butyrolactone, toluene, chloroform and mixtures thereof.

33. The composition of claim 18, wherein the organic solvent is free from diethylether and diethylene glycol, or free from diethylether or diethylene glycol.

* * * * *